United States Patent [19]

Mazanec et al.

[11] Patent Number: 4,793,904
[45] Date of Patent: Dec. 27, 1988

[54] PROCESS FOR THE ELECTROCATALYTIC CONVERSION OF LIGHT HYDROCARBONS TO SYNTHESIS GAS

[75] Inventors: Terry J. Mazanec, Solon; Thomas L. Cable, Newbury; John G. Frye, Jr., Solon, all of Ohio

[73] Assignee: The Standard Oil Company, Cleveland, Ohio

[21] Appl. No.: 105,120

[22] Filed: Oct. 5, 1987

[51] Int. Cl.$^4$ ............................................. C25B 3/00
[52] U.S. Cl. ................................................. 204/59 R
[58] Field of Search ..................................... 204/59 R

[56] References Cited

U.S. PATENT DOCUMENTS 4,374,184 2/1983 Somers et al. ...................... 429/31

FOREIGN PATENT DOCUMENTS 62-128901 6/1987 Japan .

OTHER PUBLICATIONS

Bull. Chem. Soc. Jpn., 57, 3286–3289 (1984).
Goffe and Mason, J. App. Electrochemistry, 11 (1981) 447–452.
Langer et al, Ind. Eng. Chem. Process Dev., vol. 18, No. 4, pp. 567–579.
Otsuka et al, Chemistry Letters, (Japan), pp. 319–322, 1985.
Otsuka and Morikawa, Patent Early Disclosure No. 1986-30, 688 (Japan), Uncertified translation included.
Seimanides and Stoukides, (Preprint, AIChE Meeting, Miami, Fla., Nov. 1986).
Otsuka et al, Chemistry Letters, (Japan), 1985, 499–500.

*Primary Examiner*—John F. Niebling
*Assistant Examiner*—Kathryn Gorgos
*Attorney, Agent, or Firm*—Larry W. Evans; David J. Untener; Raymond F. Keller

[57] ABSTRACT

An electrocatalytic process is described for producing synthesis gas from light hydrocarbons such as methane or natural gas. The process generally comprises the steps of (A) providing an electrochemical cell comprising a solid electrolyte having a first surface coated with conductive metal, metal oxide or mixtures thereof capable of facilitating the reduction of oxygen to oxygen ions, and a second surface coated with conductive metal, metal oxide or mixtures thereof, provided that both coatings are stable at the operating temperatures, (B) heating the cell to a temperature of at least 1000° C., (C) passing an oxygen-containing gas in contact with the first conductive coating, (D) passing methane, natural gas or other light hydrocarbons in contact with the second conductive coating, and (E) recovering synthesis gas.

23 Claims, 1 Drawing Sheet

PROCESS FOR THE ELECTROCATALYTIC CONVERSION OF LIGHT HYDROCARBONS TO SYNTHESIS GAS

TECHNICAL FIELD

This invention relates to an electrocatalytic process for producing synthesis gas from light hydrocarbons such as methane or natural gas. The process of the invention is a continuous process for the production of synthesis gas in an electrochemical reactor while optionally generating electricity.

BACKGROUND OF THE INVENTION

Synthesis gas is composed primarily of hydrogen and carbon monoxide. Generally the $H_2/CO$ ratio is from about 0.6 to 6. The production of synthesis gas from light hydrocarbons such as methane and natural gas by partial oxidation is known. The present invention describes a process for the preparation of synthesis gas from methane and natural gas by oxidation in an electrochemical reactor. In addition to the synthesis gas, electricity also may be generated as a by-product of the process of the invention.

Electrogenerative and voltameiotic processes are reviewed and compared with conventional electrochemical and heterogeneous processes in *Ind. Eng. Chem. Process Dev.*, Vol. 18, No. 4, pp. 567–579. Oxidation reactions are discussed at p. 576.

Methane and natural gas have been subjected to chemical reactions conducted in electrocatalytic cells of various types, and various products have been isolated. Otsuka et al in *Chemistry Letters*, (Japan), pages 319–322, 1985, describe the conversion of methane to ethane/ethylene in an electrocatalytic cell using silver and silver/bismuth oxide as the anode materials and a temperature of 973° F. (about 700° C.). In an earlier publication, *Bull. Chem. Soc. Jpn.*, 57, 3286–3289 (1984), the same authors described steam reforming of hydrocarbons through a wall of stabilized zirconia which acts as a hydrogen separator. The desired product is hydrogen with a minimum of carbon dioxide, carbon monoxide or hydrocarbons.

In Patent Early Disclosure No 1986-30,688 (Japan), Otsuka and Morikawa describe a method for manufacturing higher hydrocarbons from a lower hydrocarbon via oxidative dehydrogenation conducted in an electrolytic cell. The temperature of the oxygen supplied to the cell is from 300°–1000° C.

More recently, Seimanides and Stoukides reported on the oxidation of methane in a solid electrolyte cell using catalysts such as silver and lithium/magnesium oxide-silver. Ethylene, ethane, carbon monoxide and carbon dioxide were the main products. Electrochemical techniques were applied to increase the selectivity to $C_2$ products (Preprint, AIChE Meeting, Miami, Fla., November, 1986).

Otsuka et al *Chemistry Letter* (Japan), 1985, 499–500 describe the selective oxidation of methane to ethane and/or ethylene in a conventional heterogeneous catalytic reactor. A low pressure mixture of oxygen and methane in helium is passed over a metal oxide catalyst at 700° C. Among the metal oxides described as active for this reaction are included rare earth, main group metals and transition metals.

The electrocatalytic reactivity of hydrocarbons on a zirconia electrolyte surface is described by B. C. Nguyen, T. A. Lin and D. M. Mason in *J. Electrochem Soc.: Electrochemical Science and Technology*, September, 1986, pp. 1807–1815.

Numerous publications describe the complete oxidation of methane to carbon dioxide and water in fuel cells. These processes are not designed to be chemical processes, but rather to generate electricity from a fuel gas and air (or oxygen). The selectivity of these processes is designed for complete combustion rather than partial combustion.

SUMMARY OF THE INVENTION

An electrocatalytic process is described for producing synthesis gas from light hydrocarbons such as methane or natural gas. The process generally comprises the steps of (A) providing an electrochemical cell comprising a solid electrolyte having a first surface coated with conductive metal, oxide or mixtures thereof capable of catalyzing the reduction of oxygen to oxygen ions, and a second surface coated with conductive metal, metal oxide or mixtures thereof, provided that both coatings are stable at the operating temperatures, the two conductive coatings optionally being connected by an external circuit, (B) heating the electrolytic cell to a temperature of at least 1000° C., (C) passing an oxygen-containing gas in contact withh the first condutive coating, (D) passing methane, natural gas or other light hydrocarbons in contact with the secnd conductive coating, and (E) recovering synthesis gas.

DESCRIPTION OF THE PREFERRED EMBODIMENTS

This invention provides a continuous process for converting methane, natural gas or other mixtures of light hydrocarbons to synthesis gas in an electrochemical cell. The electrochemical cells utilized in the process of this invention are also referred to as electrolytic cells, electrogenerative cells or fuel cells.

Figure 1:
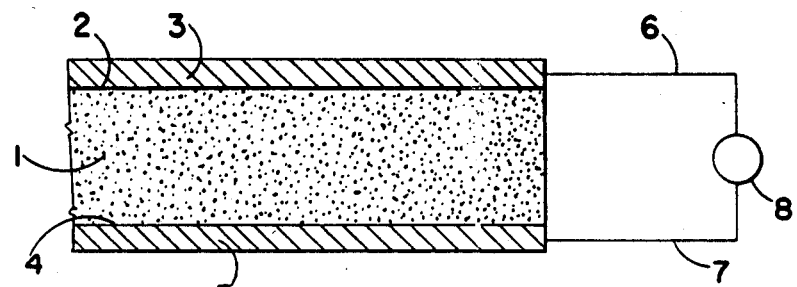
FIG. 1 is a side view, and cross-section of an apparatus suitable for carrying out the process of this invention.

The process of the present invention is conducted in an electrochemical cell such as schematically represented in FIG. 1 wherein a core of solid electrolyte 1 is coated on one surface 2 with a material 3 useful for reducing oxygen to oxygen ions. This coating provides the cathode side of the cell. On a second surface 4 of the core of solid electrolyte 1 is another coating of material 5. This coating is the anode. The two coatings may be connected by an external circuit through wire leads 6 and 7. An ammeter 8 may be included in the circuit. A battery may also be included in the circuit for aplying an electric potential between the two conductive coatings (electrodes).

In practice, an oxygen-containing gas or gas mixture is passed in contact with the first conductive coating (the cathode), and the light hydrocarbon gas containing feed gas is passed in contact with the second conductive coating (anode). As the oxygen-containing gas contacts the first conductive coating, oxygen is reduced to oxide ions which are transported through the solid electrolyte to the anode side. At the anode side (second conductive coating or surface), the oxide ions react with the light hydrocarbon gas to produce synthesis gas, and electrons are released. The electrons return to the cathode side. In one embodiment (shown in FIG. 1) where the anode and cathode are connected through an external circuit, the electrons released from the anode return to the cathode via the external circuit. In this manner, the reaction can generate a current in addition to forming the synthesis gas.

The solid electrolytes used in the process of this invention can be any material which can transfer oxygen ions under the conditions of the process, and which are stable under the operating conditions, especially at temperatures above 1000° C. Typically, oxygen ion conducting solid electrolytes are solid solutions formed between oxides containing divalent and trivalent cations such as calcium oxide, scandium oxide, yttrium oxide, lanthanum oxide, etc. with oxides containing tetravalent cations such as zirconia, thoria and ceria. Their higher ionic conductivity is due to the existence of oxygen ion site vacancies. One oxygen ion vacancy occurs for each divalent or each two trivalent cations that are substituted for a tetravalent ion in the lattice. Some of the known solid oxide transfer materials include $Y_2O_3$-stabilized $ZrO_2$, CaO-stabilized $ZrO_2$, $Sc_2O_3$-stabilized $ZrO_2$, $Y_2O_3$-stabilized $Bi_2O_3$, $Y_2O_3$-stabilized $CeO_3$, CaO-stabilized $CeO_2$, $ThO_2$, $Y_2O_3$-stabilized $ThO_2$, or $THO_2$, $ZrO_2$, $Bi_2O_3$, $CeO_2$, or $HfO_2$ stabilized by addition of any one of the lanthanide oxides or CaO. The preferred solid electrolytes are the $Y_2O_3$—(yttria) and CaO—(calcia) stabilized $ZrO_2$ (zirconia) materials. These two solid electrolytes are characterized by their high ionic conductivity, their oxygen ion conduction over wide ranges of temperature and oxygen pressure, and their relatively low cost.

The conductive coating on the solid electrolyte utilized as the cathode may be any material capable of reducing oxygen to oxygen ions and which is stable under the operating conditions. Examples of metals and metal oxides useful in the preparation of the cathode include nickel, gold, platinum, palladium, copper, lanthanum-manganese-strontium, indium oxide-stannous oxide mixtures, or any mixtures of said metals and metal oxides.

The conductive coating on the second surface of the solid electrolyte (the anode) can be any of a wide variety of conductive materials capable of facilitating the oxidative conversion of methane or natural gas to synthesis gas provided that the stable material is stable under the operating conditions. Examples of metals and metal oxides useful in forming the anode coating include nickel, gold, platinum, palladium, copper, or any mixtures of said metals and metal oxides, or other mixtures such as cerium and zirconcium oxides, cerium and lanthanum oxides, etc.

The process of the present invention is conducted at a temperature of at least 1000° C. and up to 1300° C. In one embodiment the process is conducted at temperatures within the range of 1050° to 1300° C., and more specifically within the range of 1050°-1200° C. The electrolytic cell is heated to the desired temperature and the temperature is maintained during the reaction by external heating and/or the exothermicity of the reaction.

The oxygen-containing gas which is passed in contact with the first conductive coating or cathode can be air, pure oxygen, or any other gas containing at least 1% oxygen. In another embodiment, the oxygen-containing gas does not contain dioxygen, but rather contains oxygen in other forms such as $N_2O$, $CO_2$, $SO_2$, $NO_2$, NO, etc. Preferably, the oxidizing gas is air.

The feed gases which are treated in accordance with the process of the present invention may comprise light hydrocarbons such as methane, natural gas, ethane, or other light hydrocarbon mixtures. The methane-containing feed gas can be methane or natural gas or any other gas which contains at least 1% methane. The natural gas can be either wellhead natural gas or processed natural gas. The composition of the processed natural gas varies with the needs of the ultimate user. A typical processed natural gas composition contains about 70% by weight of methane, about 10% by weight of ethane, 10% to 15% of $CO_2$, and the balance is made up of smaller amounts of propane, butane and nitrogen.

The light hydrocarbon gas feed can be mixed with any inert diluent such as nitrogen, helium, neon, argon, krytpon, xenon, or any other gas, including steam, which does not interfere with the desired reaction. Nitrogen and steam are diluents of choice.

The synthesis gas produced by the process of the invention at the anode is substantially nitrogen free and comprises a mixture of hydrogen, carbon monoxide and may contain some acetylene or ethylene or both. The synthesis gas also contains only small amounts of carbon dioxide. The synthesis gas can be converted to liquids using the Fischer-Tropsch process. The synthesis gas can be converted to methanol by commercial processes.

Figure 2:
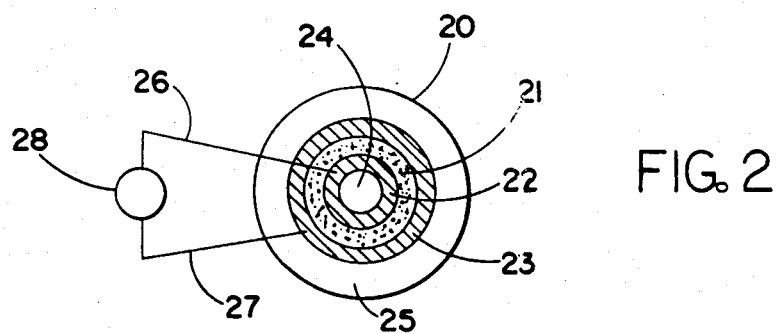
FIG. 2 is a top view, and cross-section of an electrochemical cell reactor useful for carrying out the process of the invention.
Figure 3:
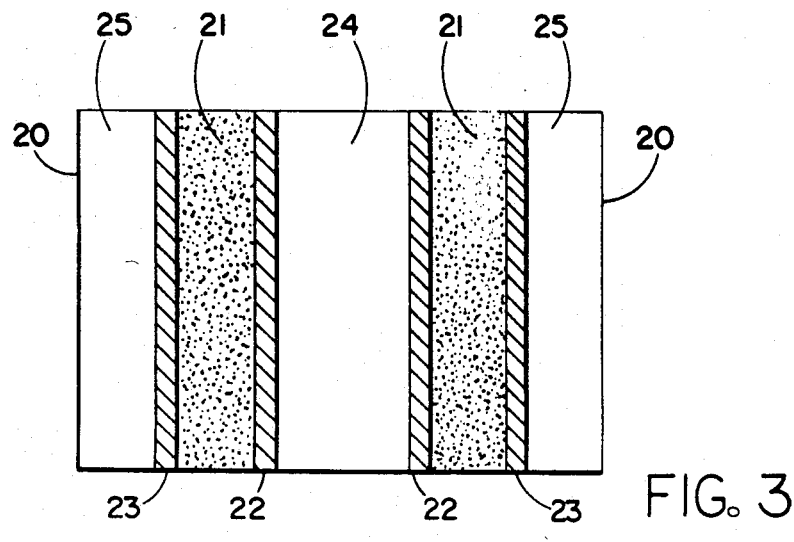
FIG. 3 is a side view, and cross-section of the reactor shown in FIG. 2.

The present invention may be further exemplified by reference to FIGS. 2 and 3. FIG. 2 is a top view of an electrochemical cell useful in conducting the process of the present invention, and FIG. 3 is a side view of the same cell. In both FIGS. 2 and 3, the electrochemical cell comprises a shell 20 in which is placed a circular solid cylindrical electrolyte core 21. The inside surface of the solid electrolyte 21 is coated with an electrically conductive metal or metal oxide which serves as the cathode 22. The outer surface of the solid electrolyte 21 is coated with an electrically conductive material 23 which serves as the anode. A wire lead 26 is attached to the inside coating 22, and a second wire lead 27 is attached to the outside coating 23, and the two wire leads are connected to form an external circuit through ammeter 28. A battery may be connected in series with the ammeter. As can be seen from the construction illustrated in FIGS. 2 and 3, the cell contains an inner open space 24 through the center of the cell and an outer open space 25 between the outer coating 23 or anode and the shell 20.

In practice, the process of the present invention is conducted with an apparatus such as illustrated in FIGS. 2 and 3 by passing an oxygen-containing gas through the inner open space 24 and hydrocarbon-containing gas through the outer open space 25. The oxygen-containing gas which contacts the inside conductive coating 22 is converted to oxygen ions which migrate through the solid electrolyte 21 to contact the outside conductive coating 23. At the surface of the outside coating 23, the oxygen ion reacts with the light hydrocarbons contacting the outside conductive coating 23 to form the synthesis gas. During this reaction, the oxygen ion loses two electrons which travel from the outer conductive coating 23 through the circuit formed by leads 26 and 27 and the ammeter/battery 28 to the inner surface coating 22.

In another embodiment, the anodes and cathodes are reversed. That is, inside conductive coating 22 is the anode and the outer conductive coating 23 is the cathode. In this embodiment, the oxygen containing gas is passed through the outer open space 25, and the hydrocarbon passed through the inner or central open space 24. Otherwise, the process in this embodiment is the same as the embodiment discussed above.

The process of the present invention generally is conducted at a pressure of from about 0.1 to about 100 atmospheres, more preferably between about 0.5 to about 10 atmospheres.

The flow rate of the hydrocarbon through the reactor may be varied as desired as long as there is sufficient contact by the hydrocarbon with the anode to result in oxidative conversion to synthesis gas. Contact times of from 0.1 to about 100 seconds may be used, and contact times of from 1 to 20 seconds are generally sufficient.

In one embodiment of the invention, the conversion of the light hydrocarbons to synthesis gas is improved by applying an electric potential between the anode and cathode. Generally, a potential of up to about 4 volts can be applied between the electrodes. The desired electric potential can be applied by the use of a battery installed in the external circuit formed by 26, 27 and 28 in FIG. 2.

In the following Examples 1–3 and C-1, the light hydrocarbons are treated in accordance with the method of the present invention in a laboratory reactor similar to the reactor illustrated in FIGS. 2 and 3. The reactor is made from a 60 cm. long (10 mm. OD, 8 mm. ID) tube of 8% yttria-stabilized zirconia obtained from Zircoa Products (Corning). The inside and outside surfaces of the tube are coated with a thin layer of platinum ink (Englehard #6926) to provide permeable electrodes. The tube is heated in air at 1060° C. for 15 minutes. The platinum electrodes are connected to an external circuit via silver wires attached to platinum stripes painted on the side of the tube. The tube is heated in air at 850° C. for about 15 minutes.

A 40 cm. section of 14 mm. OD quartz is fitted over the center section of the zirconia tube using Swagelok ™ tube fitting and Teflon ® ferrules. A Swagelok ™ tube fitting also is attached to each end of the zirconia tube which extends out of the quartz sleeve. The assembly is placed in a split furnace capable of heating to the desired temperatures, and the silver wires are connected through an ammeter and voltage regulator.

The electrodes are conditioned as follows: air is passed through the inside of the zirconia tube at 50 cc./min. Nitrogen is passed through the space between the zirconia and quartz tubes at the rate of 50 cc./min., and the tube is heated to 800° C. over the course of about 2 hours. As the reactor is heated, a current is observed in the circuit at about 380° C. After 10 minutes at 800° C., the reactor tube is heated to the reaction temperature, the nitrogen flow is replaced by the hydrocarbon, and the experiment commences.

In the following Examples 1–3 and Control-Examples C-1, the hydrocarbon is methane and the feed rate is adjusted to 8 cc./min. Samples of the gaseous products are obtained at about 20 minute intervals, and the gas samples are analyzed by gas chromatography on either a Carle Series S 111 H or a Carle Series S 400 gas chromatograph outfitted to analyze refinery gas mixtures. The results summarized below in Table I are based upon averages of at least two gas samples, and the electric current values are steady-state values. The methane conversion reported is the conversion at the termination of the reaction which is not necessarily at the completion of the reaction. The object was to analyze the product obtained. In Example 3, an external potential is applied by means of a Hewlett-Packard 6214B power supply connected in series with the ammeter. All of the experiments are conducted at atmospheric pressure.

TABLE I

| | | | Methane Conversion | | | | |
|---|---|---|---|---|---|---|---|
| Ex. | Temp. °C. | Applied Voltage | Current mA | $CH_4$ Conv* % | | C-Molar Selec.** | |
| | | | | | $C_2$'s | CO | $CO_2$ |
| C-1 | 800 | 0.0 | 227 | 23.5 | — | 95.9 | 4.1 |
| 1 | 1000 | 0.0 | 340 | 40.4 | — | 99.9 | 0.1 |
| 2 | 1100 | 0.0 | 330 | 39.2 | — | 99.9 | 0.1 |
| 3 | 1100 | 2.0 | 994 | 100 | — | 96.8 | 3.2 |

$$*\% \ CH_4 \ \text{conversion} = \frac{\text{moles } CH_4 \text{ converted}}{\text{moles } CH_4 \text{ fed}}$$

$$**\% \ \text{Selectivity} = \frac{\text{moles C in product}}{\text{moles } CH_4 \text{ converted}}$$

The currents observed and recorded in the table show that electricity can be generated as a useful by-product, and the results also show that the methane conversion can be generally increased by the application of a voltage between the electrodes.

In the following Examples 4–6, the above-described reactor is utilized, the feed gas is a natural gas composition comprising, by volume, 78.5% methane, 12.0% carbon dioxide, 6.0% ethane and 3.5% propane. In Examples 4 and 5, the feed rate is 20 cc/min. whereas the feed rate in Example 6, is 3 cc/min. Also, in Examples 4–6, there is no externally applied voltage. Samples of the gaseous products are obtained and analyzed in the manner described above with respect to Examples 1–3. The results are summarized in the following Table II.

TABLE II

| | | | Natural Gas Conversion | | | | | |
|---|---|---|---|---|---|---|---|---|
| Ex. | Temp. °C. | Current mA | Product Composition, Vol. % | | | | | |
| | | | $CH_4$ | $CO_2$ | $C_2$ | $C_3$ | CO | $H_2$ |
| 4 | 1000 | 373 | 50.9 | 7.0 | 2.1 | — | 11.8 | 28.2 |
| 5 | 1100 | 421 | 33.5 | 5.1 | 0.1 | — | 14.8 | 46.5 |
| 6 | 1100 | 430 | 0.3 | 0.1 | — | — | 37.0 | 62.6 |

The results in Table II show that (a) nearly quantitative conversion of a mixture of hydrocarbons to synthesis gas can be obtained (Example 6), (b) any carbon dioxide present in the feed is not harmful and can also be converted to synthesis gas, (c) the synthesis gas contains some $C_2$ product which is substantially ethylene and/or acetylene, and (d) electricity can be generated.

The following Examples 7–9 illustrate the process of the present invention which utilizes rare earth metal oxide anodes. The cathode in the following example is platinum.

The cerium:lanthanum oxide anode is prepared as follows: the inside surface of a yttria-stabilized zirconia tube is coated with a thin layer of platinum ink to provide a permeable cathode. The tube is heated in air at 1060° C. for 15 minutes. A mixture of cerium oxide and lanthanum oxide with a molar ratio of Ce:La of 1:1, slurried in a water/ethylene glycol mixture is applied to the external surface of the tube. The tube is fired in air at 1200° C. for 3 hours. The electrodes are connected in the circuit via platinum stripes and silver wires as described in previous examples.

The cerium zirconium anode is prepared in the same manner except that cerium zirconate (CeZrO$_4$ from Cerac) is substituted for the cerium oxide:lanthanum oxide mixture, and the tube is fired at only 120° C. for 15 minutes. In Examples 7-9, the feed gas is methane, the flow rate is 8 cc/min. and an external voltage of 2.0 volts is applied in each of Examples 7-9. Other details of the process and the results of the analysis of the product obtained in Examples 7-9 are summarized in the following Table III.

TABLE III

| | | | | Methane Conversion | | | |
|---|---|---|---|---|---|---|---|
| Ex. | Anode | Temp. °C. | Current mA | CH$_4$ Conv.* % | C Molar Selectivity* | | |
| | | | | | C$_2$ | CO | CO$_2$ |
| 7 | CeLa | 1050 | 516 | 47.3 | 0.4 | 99.5 | 0.1 |
| 8 | CeZr | 1050 | 623 | 36.5 | 1.9 | 77.6 | 20.5 |
| 9 | CeZr | 1100 | 621 | 49.2 | 0.9 | 90.9 | 8.2 |

*See definition in Table I.

The results obtained in Examples 7-9 demonstrate that metal oxide anodes are effective in converting hydrocarbons to synthesis gas, and the synthesis gas can contain some C$_2$ material which is substantially ethylene and/or acetylene.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An electrocatalytic process for converting methane, natural gas or other light hydrocarbons to synthesis gas which comprises
    (A) providing an electrochemical cell comprising a solid electrolyte having a first surface coated with conductive metal, metal oxide or mixtures thereof capable of facilitating the reduction of oxygen to oxygen ions, and a second surface coated with conductive metal, metal oxide or mixtures thereof, provided that both coatings are stable at the operating temperatures,
    (B) heating the electrochemical cell to a temperature of at least 1000° C.,
    (C) passing an oxygen-containing gas in contact with the first conductive coating,
    (D) passing methane, natural gas or other light hydrocarbons in contact with the second conductive coating, and
    (E) recovering synthesis gas.

2. The process of claim 1 wherein the two conductive coatings are connected by an external circuit.

3. The process of claim 1 wherein said solid electrolyte comprises yttria stabilized zirconia or calcia stabilized zirconia.

4. The process of claim 1 wherein the first conductive coating comprises nickel, gold, platinum, palladium, copper, lanthanum-manganese-strontium or indium oxide-stannous oxide mixtures, or any mixtures of said metals.

5. The process of claim 1 wherein the first conductive coating comprises platinum.

6. The process of claim 1 wherein the second conductive coating comprises nickel, gold, platinum, palladium, copper, mixtures of said metals, cerium-lanthanum oxide mixtures, or cerium-zirconium oxide mixtures.

7. The process of claim 1 wherein the second conductive coating is platinum.

8. The process of claim 1 wherein the second conductive coating comprises a cerium-lanthanum oxide mixture.

9. The process of claim 1 wherein the second conductive coating comprises a cerium-zirconium oxide mixture.

10. The process of claim 1 wherein the first and second conductive coatings are platinum.

11. The process of claim 1 wherein the synthesis gas recovered in step (E) comprises carbon monoxide, hydrogen, and at least some acetylene, or ethylene, or mixtures of acetylene and ethylene.

12. The process of claim 1 conducted at a temperature of from about 1050° C. to about 1300° C.

13. The process of claim 1 conducted at a pressure of from about 0.1 to about 100 atmospheres.

14. The process of claim 1 wherein the oxygen-containing gas is air or oxygen.

15. The process of claim 1 wherein an electric potential is applied between the two conductive coatings.

16. An electrocatalytic process for producing synthesis gas from methane, natural gas or other light hydrocarbons which comprises the steps of
    (A) providing an electrochemical cell comprising a solid electrolyte having a first conductive surface of platinum and a second conductive surface of platinum, the two conductive surfaces being connected by an external circuit,
    (B) heating the electrochemical cell to a temperature in the range of about 1050° C. to about 1200° C.,
    (C) passing an oxygen-containing gas in contact with the first conductive surface while,
    (D) passing methane or natural gas in contact with the second conductive surface, and
    (E) recovering the synthesis gas.

17. The process of claim 16 wherein methane is passed in contact with the second conductive surface.

18. The process of claim 16 wherein the recovered synthesis gas comprises carbon monoxide, hydrogen and at least some acetylene.

19. The process of claim 16 conducted at a pressure of from about 0.5 to about 10 atmospheres.

20. The process of claim 16 wherein the oxygen-containing gas is air.

21. The process of claim 16 wherein an electric potential is applied between the two conductive surfaces.

22. The synthesis gas prepared in accordance with claim 1.

23. The synthesis gas prepared in accordance with the process of claim 16.

* * * * *